3,133,100
STABLE LEAD ALKYL COMPOSITIONS AND A METHOD FOR PREPARING THE SAME
Wilford H. Thomas and Shirl E. Cook, Baton Rouge, La., assignors to Ethyl Corporation, New York, N.Y., a corporation of Virginia
No Drawing. Filed June 8, 1962, Ser. No. 200,938
8 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition becomes selfpropagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz. separation, purification, blending transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of cyclooctadiene (i.e., any individual isomeric form thereof, or a mixture of such isomers). The foregoing objects are also accomplished by conducting one or more of the foregoing operations in the presence of the cyclooctadiene. Generally speaking, the amount of cyclooctadiene so used is from about 0.5 to about 30 percent based on the weight of the alkyllead compound although departures may be made from this concentration range should this be desirable. For most conditions of operation and service cyclooctadiene concentrations of from about 1 to about 20 percent based on the weight of the alkyllead compound give particularly excellent results and are therefore preferred. The cyclooctadiene thermal stabilizer of this invention, when used in the foregoing amounts, is very effective in substantially inhibiting or preventing thermal decomposition of the alkyllead compound at temperatures ranging from about 100° C., up to about 195° C. for extended periods of time.

A feature of this invention is the experimentally verified fact that the cyclooctadiene structure, in some currently unexplainable fashion, exerts a very marked thermal stabilizing effectiveness upon the alkyllead compound even though the system is subjected to the high temperature of 195° C. The molecular configuration of cyclooctadiene is apparently such that the normally violent decomposition reactions are blocked or otherwise inhibited for exceedingly long periods of time. This behavior is most unusual particularly in the light of the fact that somewhat closely related cycloolefins heretofore suggested as thermal stabilizers fall far short of cyclooctadiene in their ability to prevent this deleterious thermal decomposition of alkyllead compounds. The striking difference between cyclooctadiene compounds on the one hand and known cycloolefin thermal stabilizers on the other, will become manifestly clear from the experimental data set forth hereinafter.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C., without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C., or below.

The remainder of the compositions tested in the manner described above and the results thereby obtained are shown in the following table.

TABLE

*Effect of Additives on Thermal Decomposition of Alkyllead Compounds at 195° C.*

| No. | Additive | Additive Conc., Wt. Percent of TEL | Thermal Stability, Time to Decomposition, Minutes |
|---|---|---|---|
| 1 | Cyclooctadiene-1,5 | 15 | 117 |
| 2 | Cyclohexene | 15 | 6 |
| 3 | Dicyclopentadiene | 15 | 31 |

It will be seen from run 1 above that the use of a cyclooctadiene pursuant to this invention conferred a substantial amount of protection against thermally induced decomposition of the tetraethyllead even when exposed continuously to a temperature of 195° C. In sharp contrast, the same concentrations of either cyclohexene or dicyclopentadiene (additives disclosed in U.S. Patents 2,660,591–596) were much less effective in this respect. That there should be such a sharp improvement by the use of cyclooctadiene is unexpected and unexplainable at this time, particularly since the prior art thermal stabilizers have chemical structures in the same broad general class of compounds—viz., cycloolefinic hydrocarbons.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

The cyclooctadiene thermal stabilizers of this invention may be one or a mixture of the isomeric forms thereof which may be further substituted on the ring by lower alkyl groups, especially methyl and/or ethyl groups. The presence of these alkyl substituents on the ring does not detract from the thermal stabilizer effectiveness of the fundamental cyclooctadiene molecular configuration. Typical of such cyclooctadiene compounds are: 1,3-cyclooctadiene; 1,4-cyclooctadiene; 1,5-cyclooctadiene; 5-methyl-1,3-cyclooctadiene; 6-n-butyl-1,3-cyclooctadiene; 5,6-diethyl-1,3-cyclooctadiene; 5,8-di-n-propyl-1,3-cyclooctadiene; 3-n-propyl-1,4-cyclooctadiene; 7-i-butyl-1,4-cyclooctadiene; 3,7-diethyl-1,4-cyclooctadiene; 3,6-dimethyl-8-ethyl-1,4-cyclooctadiene; 6,7,8-tri-n-propyl-1,4-cyclooctadiene; 3,6,7,8-tetramethyl-1,4-cyclooctadiene; ethyl-1,5-cyclooctadiene; 3,4-dimethyl-1,5-cyclooctadiene; 3-methyl-7-ethyl-1,5-cyclooctadiene; 3-ethyl-8-t-butyl-1,5-cyclooctadiene; 3,4-dimethyl-7,8-di-i-propyl-1,5-cyclooctadiene, mixtures of such materials, and the like. Consequently, the use of such lower alkylated cyclooctadiene compounds, either alone or in admixture with each other, or in admixture with unsubstituted cyclooctadiene isomers, falls within the spirit, scope, and ambit of this invention.

We claim:

1. A method of inhibiting the decomposition of an alkyllead compound at temperatures of from about 100° C., to about 195° C., which comprises incorporating with said compound from about 0.5 to about 30 weight percent of cyclooctadiene based on the weight of said compound.

2. The method of claim 1 wherein the concentration of the cyclooctadiene is from about 1 to about 20 weight percent based on the weight of said alkyllead compound.

3. In the process of producing an alkyllead compound by reacting a sodium lead alloy with alkyl chloride and separating the thus produced alkyllead compound from the reaction mass by steam distillation, the step which comprises conducting said steam distillation in the presence of from about 0.5 to about 30 weight percent of cyclooctadiene based on the weight of said compound.

4. The process of claim 3 wherein the concentration of the cyclooctadiene is from about 1 to about 20 weight percent based on the weight of said alkyllead compound.

5. A concentrated alkyllead compound with which has been blended from about 0.5 to about 30 weight percent of cyclooctadiene based on the weight of said compound.

6. The composition of claim 5 wherein the concentration of the cyclooctadiene is from about 1 to about 20 weight percent based on the weight of the alkyllead compound.

7. The composition of claim 5 wherein said compound is selected from the group consisting of tetramethyllead, ethyltrimethyllead, diethyldimethyllead, triethylmethyllead, tetraethyllead, and mixtures thereof.

8. A concentrated alkyllead compound with which has been blended about 15 percent of cyclooctadiene, based on the weight of said compound.

References Cited in the file of this patent

FOREIGN PATENTS 718,567     Great Britain           Nov. 17 1954